(12) United States Patent
Sung

(10) Patent No.: US 10,794,355 B2
(45) Date of Patent: Oct. 6, 2020

(54) SYSTEM AND METHOD FOR CONTROLLING WAVE POWER GENERATION FACILITIES

(71) Applicant: INGINE, INC., Seoul (KR)

(72) Inventor: Yong Jun Sung, Guri-si (KR)

(73) Assignee: INGINE, INC., Seoul (KR)

( * ) Notice: Subject to any disclaimer, the term of this patent is extended or adjusted under 35 U.S.C. 154(b) by 0 days.

(21) Appl. No.: 15/533,324

(22) PCT Filed: Apr. 19, 2017

(86) PCT No.: PCT/KR2017/004160
§ 371 (c)(1),
(2) Date: Jun. 5, 2017

(87) PCT Pub. No.: WO2018/182086
PCT Pub. Date: Oct. 4, 2018

(65) Prior Publication Data
US 2020/0032764 A1    Jan. 30, 2020

(30) Foreign Application Priority Data
Mar. 31, 2017   (KR) .................. 10-2017-0041806

(51) Int. Cl.
*F03B 13/16* (2006.01)
*F03B 15/00* (2006.01)
*F03B 17/02* (2006.01)

(52) U.S. Cl.
CPC .............. *F03B 13/16* (2013.01); *F03B 15/00* (2013.01); *F03B 17/02* (2013.01)

(58) Field of Classification Search
CPC ......... B63B 22/18; F16H 59/04; F16H 55/36; F16H 55/32; F03B 13/18; F03B 15/00; F03B 13/16; F16P 7/00
See application file for complete search history.

(56) References Cited

U.S. PATENT DOCUMENTS

2009/0322080 A1    12/2009   Ruiz Minguela et al.
2012/0112472 A1*   5/2012    Murray ................ H02J 15/003
                                                      290/1 R
(Continued)

FOREIGN PATENT DOCUMENTS

JP         5260092 B2    8/2013
KR    20080035478 A      4/2008
(Continued)

OTHER PUBLICATIONS

WO-2016111461-A1 English Translation (Year: 2016).*
KR-20140099989-A English Translation (Year: 2013).*

*Primary Examiner* — Shafiq Mian
(74) *Attorney, Agent, or Firm* — McCoy Russell LLP

(57) ABSTRACT

A power generation facility control system includes a power transmitter including a connection member configured to transfer kinetic energy of a buoyant body that moves by wave energy, a motion converter configured to convert the kinetic energy transferred from the power transmitter to rotational kinetic energy of a rotating body, a first route configured to receive the rotational kinetic energy from the motion converter, and to generate electric power, and a second route configured to receive and store the rotational kinetic energy from the motion converter, or to transfer, to the motion converter, rotational kinetic energy that is restored using stored energy.

20 Claims, 3 Drawing Sheets

(56) References Cited

U.S. PATENT DOCUMENTS

2014/0152015 A1\* 6/2014 Sidenmark .......... F03B 13/1885
 290/53
2015/0211478 A1\* 7/2015 Dragic ................ F03B 13/1855
 60/505

FOREIGN PATENT DOCUMENTS

| KR | 20120007224 A | | 1/2012 | |
|----|---|---|---|---|
| KR | 20140099989 A | \* | 8/2014 | |
| KR | 20140099989 A | | 8/2014 | |
| KR | 1020150120709 A | | 10/2015 | |
| KR | 20150134943 A | | 12/2015 | |
| WO | 2016111461 A1 | | 7/2016 | |
| WO | WO-2016111461 A1 | \* | 7/2016 | ............. B63B 22/18 |

\* cited by examiner

SYSTEM AND METHOD FOR CONTROLLING WAVE POWER GENERATION FACILITIES

CROSS-REFERENCE TO RELATED APPLICATIONS

The present application is a U.S. National Phase of International Patent Application Serial No. PCT/KR2017/004160, entitled "SYSTEM AND METHOD FOR CONTROLLING WAVE POWER GENERATION FACILITIES," filed on Apr. 19, 2017. International Patent Application Serial No. PCT/KR2017/004160 claims priority to Korean Patent Application No. 10-2017-0041806, filed on Mar. 31, 2017. The entire contents of which are hereby incorporated by reference in their entirety for all purposes.

TECHNICAL FIELD

Example embodiments relate to a system and method for controlling a wave power generation facility, and more particularly, to a system and method for providing a restoring force at a stage of converting wave energy to rotational kinetic energy in a wave power generation facility.

RELATED ART

Tidal power generation for producing electrical energy using a tidal power difference, a tidal current power generation for producing electrical using the fast flow velocity of seawater, and a wave power generation for producing electrical energy using waves are attaining great attention. In particular, the wave power generation refers to technology for generating electrical energy using a movement of continuously occurring waves, and may continuously generate energy.

Here, due to a characteristic of waves, irregular kinetic energy is provided. To stably produce energy using the irregular kinetic energy, there is a need for a method and system that may effectively provide a restoring force so that a power transmitter to transfer wave energy and a motion converter to convert the transferred kinetic energy to rotational kinetic energy available for power generation.

RELATED ART PATENT DOCUMENTS

Korean Patent Publication No. 10-2015-0120709
Japanese Patent Registration No. 5260092

DESCRIPTION

Solution

According to an aspect, a power generation facility generation system includes a power transmitter including a connection member configured to transfer kinetic energy of a buoyant body that moves by wave energy; a motion converter configured to convert the kinetic energy transferred from the power transmitter to rotational kinetic energy of a rotating body; a first route configured to receive the rotational kinetic energy from the motion converter, and to generate electric power; and a second route configured to receive and store the rotational kinetic energy from the motion converter, or to transfer, to the motion converter, rotational kinetic energy that is restored using stored energy.

In an example embodiment, the first route includes a power generator configured to generate alternating current (AC) power using the rotational kinetic energy. In an example embodiment, the power generation facility control system further includes a power generation controller configured to control output AC power of the power generator using a 3-phase current rectification scheme.

In an example embodiment, the second route is configured to transfer, to the motion converter, the rotational kinetic energy that is restored using the stored energy when a tension of the connection member is less than or equal to a reference value or when a revolution per minute (RPM) of the rotating body is less than or equal to the reference value.

In an example embodiment, the second route includes a storage configured to store the rotational kinetic energy; and a motor configured to operate using the rotational kinetic energy or energy stored in the storage.

In an example embodiment, the power generation facility control system further includes a restoring force controller configured to control an energy transfer rate between the motor and the motion converter using an inverter switching scheme.

In an example embodiment, the storage includes a condenser in which the rotational kinetic energy is converted to electrical energy and thereby stored.

In an example embodiment, the second route further includes a transmission configured to change a rotational speed and torque according to the rotational kinetic energy transferred between the motor and the motion converter.

According to another aspect, a power generation facility control system includes a power transmitter including a connection member configured to transfer kinetic energy generated from natural power; a motion converter configured to convert the kinetic energy transferred from the power transmitter to rotational kinetic energy of a rotating body; a power generation route configured to receive the rotational kinetic energy from the motion converter, and to generate electric power; and a restoring force control route configured to receive and store the rotational kinetic energy from the motion converter, or to transfer, to the motion converter, rotational kinetic energy that is restored using stored energy.

In an example embodiment, the power generation facility control system further includes a controller configured to control the motion converter to transfer the rotational kinetic energy to the power generation route when a magnitude of the rotational kinetic energy output from the motion converter is greater than or equal to a predetermined threshold value.

In an example embodiment, the power generation facility control system further includes a controller configured to control the motion converter to transfer the rotational kinetic energy to the restoring force control route or to receive the rotational kinetic energy from the restoring force control route when a magnitude of the rotational kinetic energy output from the motion converter is less than a predetermined threshold value.

In an example embodiment, the controller is configured to control the motion converter to transfer the rotational kinetic energy that is restored using the stored energy from the restoring force control route when a tension of the connection member is less than or equal to a reference value or when an RPM of the rotating body is less than or equal to the reference value.

In an example embodiment, the power generation facility control system further includes a power generation controller configured to control output AC power of the power generation route using a 3-phase current rectification scheme.

In an example embodiment, the power generation facility control system further includes a restoring force controller configured to control an energy transfer rate between the restoring force control route and the motion converter using an inverter switching scheme.

In an example embodiment, the restoring force control route includes a storage to store the converted rotational kinetic energy; and a motor configured to operate using the rotational kinetic energy or energy stored in the storage.

In an example embodiment, the restoring force control route further includes a transmission configured to change a rotational speed and torque according to the rotational kinetic energy transferred between the motor and the motion converter.

According to another aspect, a power generation facility control method includes transferring, by a connection member, kinetic energy that is generated from natural power to a motion converter; converting, by the motion converter, the kinetic energy to rotational kinetic energy of a rotating body; measuring a magnitude of the rotational kinetic energy output from the motion converter; and determining an energy transfer rate of a power generation route and an energy transfer direction and an energy transfer rate of a restoring force control route based on the measured magnitude of the rotational kinetic energy.

In an example embodiment, the determining includes controlling the motion converter to transfer the rotational kinetic energy to the power generation route when the magnitude of the rotational kinetic energy output from the motion converter is greater than or equal to a predetermined threshold value.

In an example embodiment, the determining includes controlling the motion converter to transfer the rotational kinetic energy to the restoring force control route or to receive the rotational kinetic energy from the restoring force control route when the magnitude of the rotational kinetic energy is less than or equal to a predetermined threshold value.

In an example embodiment, the determining includes controlling the motion converter to receive the rotational kinetic energy from the restoring force control route when a tension of the connection member is less than or equal to a reference value or when an RPM of the rotating body is less than or equal to the reference value.

In an example embodiment, the power generation facility control method further includes controlling output AC power of the power generation route using a 3-phase current rectification scheme.

In an example embodiment, the power generation facility control method further includes controlling an energy transfer rate between the restoring force control route and the motion converter using an inverter switching scheme.

BEST MODE

Figure 1:
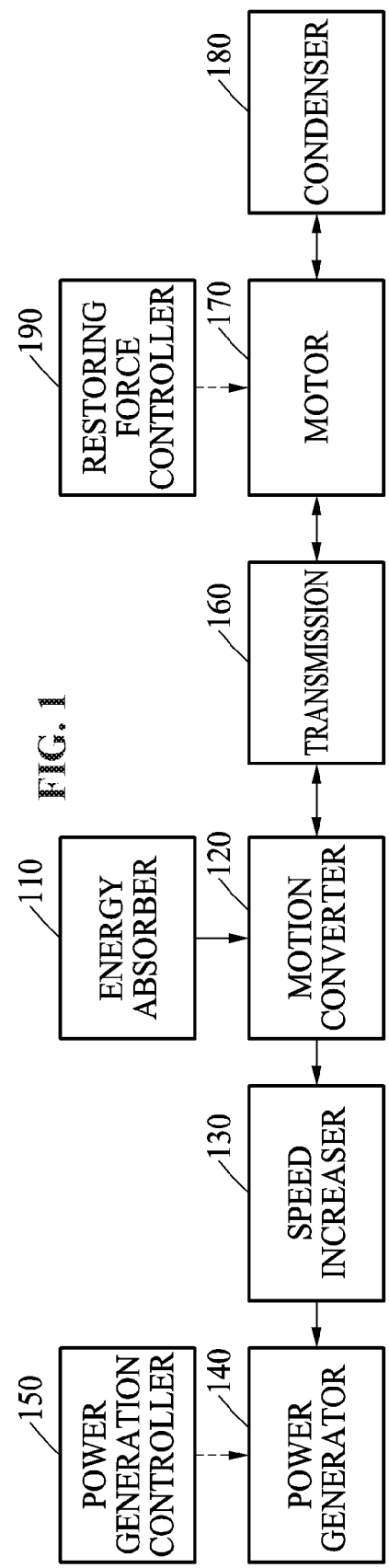
FIG. 1 is a block diagram illustrating a power generation facility control system according to an example embodiment.

The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

Terms, such as first, second, and the like, may be used herein to describe components. Each of these terminologies is used merely to distinguish a corresponding component from other component(s). For example, a first component may be referred to as a second component, and similarly the second component may also be referred to as the first component.

It should be noted that if it is described that one component is "connected", "coupled", or "joined" to another component, a third component may be present between the component and the other component although the component may be directly connected, coupled, or joined to the other component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, the example embodiments are described with reference to the accompanying drawings. However, the scope of rights is not limited thereto or restricted thereby. Like reference numeral illustrated in the drawings refer to like elements throughout.

FIG. 1 is a block diagram illustrating a power generation facility control system according to an example embodiment. The power generation facility control system may be a part of a wave power generation system that generates power from wave energy, which is variable by various environmental factors, and supplies the power to electrical power systems.

In an example embodiment, the power generation facility control system may include an energy absorber 110 configured to transfer wave energy generated from natural power to an inside of a power generation equipment. The energy absorber 110 may include, for example, a buoyant body and a power transmitter. The buoyant body may be provided at a location at which the buoyant body may receive the wave energy and may move. For example, the buoyant body may be a buoy that moves by the kinetic energy of waves. The power transmitter may serve to transfer kinetic energy occurring along a movement of the buoyant body to the inside of the power generation facility in order to supply power to the power generation facility. For example, the power transmitter may include a connection member, such as a wire, a rope, a chain, and a sprocket, capable of transferring the kinetic energy.

In an example embodiment, the power generation facility control system may include a motion converter 120 configured to convert the kinetic energy transferred from the energy absorber 110 to rotational kinetic energy. The buoyant body of the energy absorber 110 performs a total of 6 degree of freedom (6DoF) motions, transitional motions using x, y, and z axes and rotational motions such as yaw, pitch, and roll. The motion of the buoyant body may be transferred to the motion converter 120 through the power transmitter. For example, the power transmitter may substantially perform a reciprocating motion based on the 6DoF motion of the buoyant body. The motion converter 120 may include a rotating body and a rotational shaft capable of converting the reciprocating motion of the power transmitter to the rotational motion.

In an example embodiment, the power generation facility control system may include a first route configured to receive the rotational kinetic energy from the motion converter 120 and to generate electric power, and a second route configured to receive and store the rotational kinetic energy from the motion converter 120, or to transfer, to the motion converter 120, rotational kinetic energy that is restored using stored energy.

In an example embodiment, the first route may be a power generation route that includes a speed increaser 130, a power generator 140, and a power generation controller 150. Referring to FIG. 1, the first route may be configured to receive energy uni-directionally from the motion converter 120. The speed increaser 130 may serve to change a rotational speed and torque of the rotational kinetic energy transferred using a gear and the like. For example, it is possible to increase the rotational speed and to decrease the torque using the speed increaser 130. The power generator 140 may include an alternating current (AC) power generator configured to generate AC power to be supplied to a system. The power generation controller 150 of a 3-phase current rectification scheme may be provided to control an output of the power generator 140.

In an example embodiment, the second route may be a restoring force control route that includes a transmission 160, a motor 170, a condenser 180, and a restoring force controller 190. Referring to FIG. 1, the second route may be configured to transfer mutual energy bi-directionally with the motion converter 120. The transmission 160 may serve to change the rotational speed and the torque of the rotational kinetic energy transferred using a gear and the like.

In an example embodiment, the motor 170 may serve as a medium to store the rotational kinetic energy once the rotational kinetic energy is transferred. For example, the rotational kinetic energy of the motor 170 may be converted to electrical energy and stored in the condenser 180. Also, the motor 170 may restore the rotational kinetic energy using the energy stored in the condenser 180 and may transfer the restored rotational kinetic energy to the motion converter 120. For example, due to irregularity of waves or a change in other conditions, a magnitude of the rotational kinetic energy output from the motion converter 120 or a tension of the power transmitter may not be readily maintained to be uniform. In this case, the motor 170 may restore the stored energy as the rotational kinetic energy, and may provide the same to the motion converter 120. The restoring force controller 190 of an inverter switching scheme may be provided to control an energy transfer rate using the motor 170.

In an example embodiment, the condenser 180 may be replaced with an appropriate storage capable of storing the rotational kinetic energy with or without converting the rotational kinetic energy. Also, the condenser 180 may be designed to connect to an energy storage system (ESS) on the power generation route and to transfer the energy bi-directionally.

In an example embodiment, the power generation controller 150 may control the output of the power generator 140 using the 3-phase current rectification scheme, and the restoring force controller 190 may control the energy transfer rate with the motor 170 using the inverter switching scheme. The 3-phase current rectification scheme may configure a controller with relatively small cost, may use a relatively small amount of power, and may have a relatively excellent stability and reliability. Here, if low rotational kinetic energy is input, that is, for example, if a RPM of the motion converter 120 is low, the 3-phase current rectification scheme may have a relatively great degradation in control performance. On the contrary, the inverter switching scheme may use additional power for switching control and may have a relatively low stability and reliability, however, may have an excellent control performance and an input/output threshold value that is not limited.

Considering a difference between the 3-phase current rectification scheme and the inverter switching scheme, the power generation controller 150 and the restoring force controller 190 may proceed with a power generation by providing the rotational kinetic energy generally to the first route while the RPM of the motion converter 120 is maintained to be greater than or equal to a reference value, and may store energy by providing the rotational kinetic energy to the second route or may receive insufficient rotational kinetic energy from the second route when the RPM of the motion converter 120 is less than the reference value.

That is, operations of the first route and the second route may be controlled by comparing a magnitude of the rotational kinetic energy output from the motion converter 120 to a predetermined threshold value. By applying control of the 3-phase current rectification scheme and control of the inverter switching scheme to the individual routes in parallel, it is possible to minimize a performance degradation and to efficiently cope with slightly irregular rotational kinetic energy output.

Figure 2:
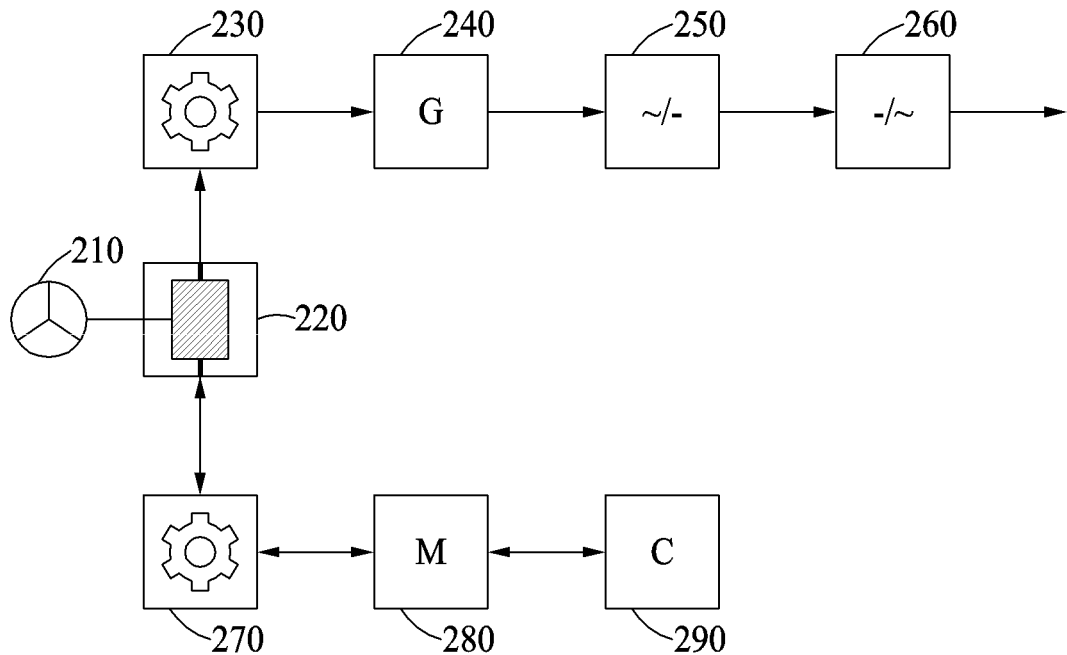
FIG. 2 is a diagram illustrating an example of a power generation facility control system according to an example embodiment.

FIG. 2 is a diagram illustrating an example of a power generation facility control system according to an example embodiment. For example, a structure of FIG. 2 may be a portion of an example that embodies the power generation facility control system of FIG. 1.

In an example embodiment, the power generation facility control system may include an energy absorber 210, a motion converter 220, a speed increaser 230, a power generator 240, an AC/DC converter 250, and a DC/AC converter 260. Also, the power generation facility control system may further include a transmission 270, a motor 280, and a condenser 290.

The energy absorber 210 may collect wave energy through a buoyant body and a power transmitter, and may transfer kinetic energy in a form of a reciprocating motion, etc. Although description is made based on an example embodiment in which the energy absorber 210 collects the kinetic energy using wave energy, a configuration of collecting and transferring the kinetic energy that is generated from natural power may be additionally or alternatively included.

The motion converter 220 serves to convert the kinetic energy transferred from the energy absorber 210 to rotational kinetic energy. For example, the motion converter 220 may include a rotating body and a rotational shaft capable of converting a reciprocating motion to a rotational motion.

The power generation facility control system may include a power generation route and a restoring force control route that are diverged at the motion converter 220. The power generation route may include the speed increaser 230, the power generator 240, the AC/DC converter 250, and the DC/AC converter 260, and the restoring force control route may include the transmission 270, the motor 280, and the condenser 290. The motion converter 220 is configured to transfer energy uni-directionally with respect to the power generation route, and to transfer mutual energy bi-directionally with respect to the restoring force control route.

Using the speed increaser 230, the power generator 240, the AC/DC converter 250, the DC/AC converter 260, and the like, the power generation route may generate the power generated by the power generator 240 to be in a form easy for power transmission, and may supply the generated power to a system. Here, the output power of the power generator 240 may be controlled based on a 3-phase current rectification scheme that uses a relatively high threshold value, however, has a relatively excellent stability.

Using the transmission 270, the motor 280, and the condenser 290, the restoring force control route may complement the performance degradation of the energy absorber 210 and the motion converter 220 occurring due to irregularity of natural power. In detail, when a tension of a connection member of the energy absorber 210 is decreased to be less than or equal to a reference value, or when a RPM of a rotating body of the motion converter 220 is decreased to be less than or equal to the reference value, the restoring force control route may transfer a restoring force for complementing the decrease to the motion converter 220. Here, an energy transfer rate between the restoring force control route using the motor 280 and the motion converter 220 may be controlled based on an inverter switching scheme that has a relatively excellent control performance and a relatively low threshold limit value.

Figure 3:
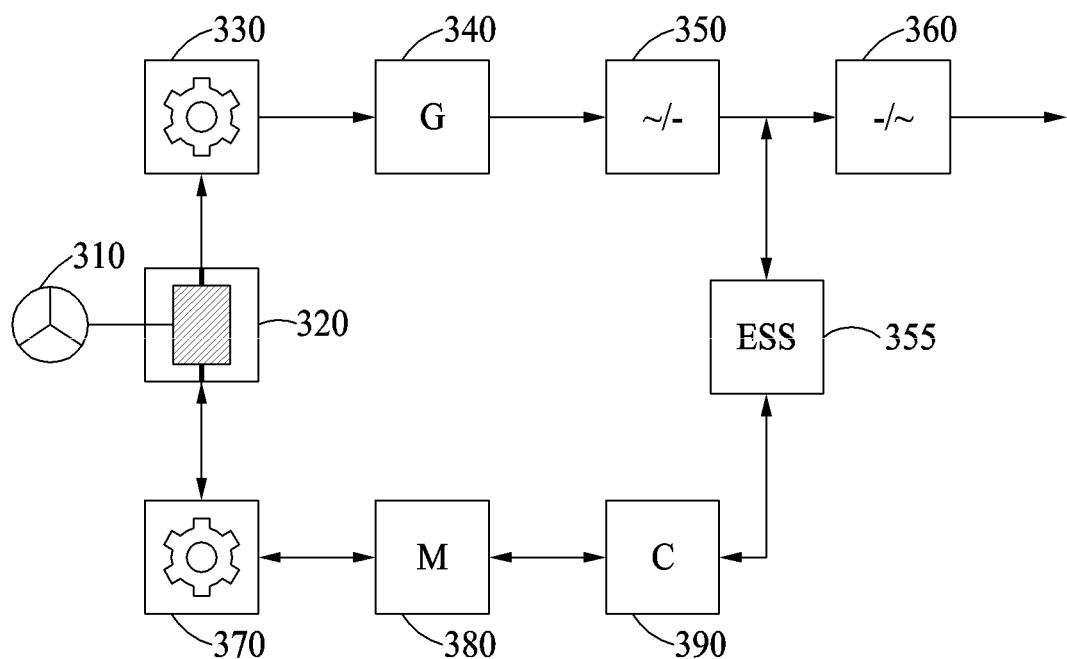
FIG. 3 is a diagram illustrating another example of a power generation facility control system according to an example embodiment.

FIG. 3 is a diagram illustrating another example of a power generation facility control system according to an example embodiment. For example, a structure of FIG. 3 may be a portion of an example that embodiments the power generation facility control system of FIG. 1.

In an example embodiment, the power generation facility control system may include a buoyant body 310, a motion converter 320, a speed increaser 330, a power generator 340, an AC/DC converter 350, an ESS 355, and a DC/AC converter 360. Also, the power generation facility control system may further include a transmission 370, a motor 380, and a condenser 390.

Similar to the power generation facility control system of FIG. 2, the power generation facility control system may include a power generation route and a restoring force control route that are diverged at the motion converter 320. The power generation route may include the speed increaser 330, the power generator 340, the AC/DC converter 350, the ESS 355, and the DC/AC converter 360, and the restoring force control route may include the transmission 370, the motor 380, and the condenser 390. The motion converter 220 is configured to transfer energy uni-directionally with respect to the power generation route, and to transfer mutual energy bi-directionally with respect to the restoring force control route.

A difference between the power generation facility control system of FIG. 3 and the power generation facility control system of FIG. 2 lies in that the ESS 355 of the power generation route and the condenser 390 of the restoring force control route are configured to mutually transfer the energy. Also, although FIG. 3 illustrates that the ESS 355 and the condenser 390 are directly connected, a connection relationship for energy transfer may be alternatively or additionally set between different components of the respective routes. For example, based on a design, the ESS 355 of the power generation route may be configured to directly transfer the energy to the motor 380 of the restoring force control route, and the AC/DC converter 350 and the DC/AC converter 360 of the power generation route may be directly connected to the condenser 390 of the restoring force control route. The energy stored in the respective routes through the connection relationship may be mutually transferred. Thus, it is possible to relatively flexibly cope with a relatively irregular power generation environment.

Figure 4:
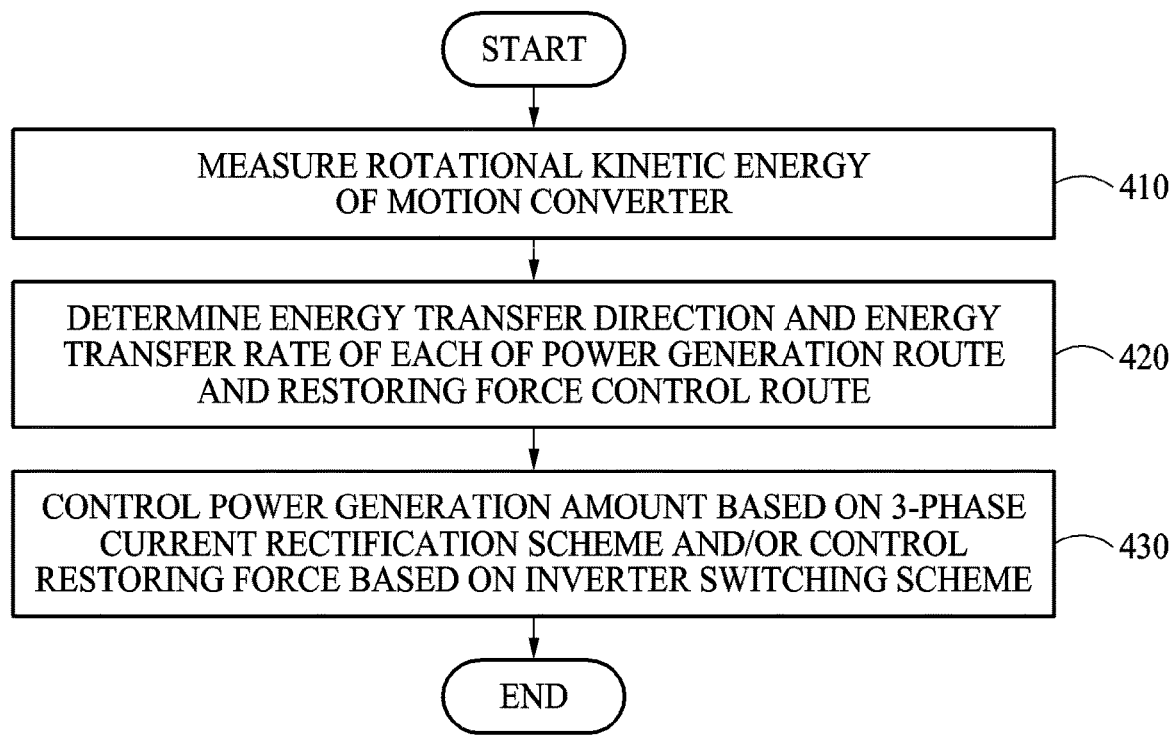
FIG. 4 is a flowchart illustrating a power generation facility control method according to an example embodiment.

FIG. 4 is a flowchart illustrating a power generation facility control method according to an example embodiment. The power generation facility control method may be employed to operate, for example, the power generation facility control systems of FIGS. 1 through 3.

In operation 410, rotational kinetic energy of a motion converter may be measured. Due to a variety of factors, irregular rotational kinetic energy may be output from the motion converter of a power generation facility using natural power. Accordingly, a power generation route and a restoring force control route may be controlled based on the rotational kinetic energy that is output from the motion converter.

The rotational kinetic energy of the motion converter may be measured based on a RPM of a rotating body that performs a rotational motion, and the like. Also, in addition to the rotational kinetic energy, a tension of a connection member included in the motion converter or an energy absorber may be additionally or alternatively measured.

In operation 420, an energy transfer direction and an energy transfer rate of each of the power generation route and the restoring force control route may be determined. In an example embodiment, the motion converter is configured to transfer energy uni-directionally with respect to the power generation route and to transfer mutual energy bi-directionally with respect to the restoring force control route.

Here, a level of kinetic energy to be transferred from the motion converter to the power generation route may be determined based on a parameter, such as a magnitude of the rotational kinetic energy measured in operation 410, and the like. Also, whether to control the motion converter to transfer the kinetic energy to the restoring force control route or to receive the kinetic energy from the restoring force control route may be determined.

In detail, when the magnitude of the rotational kinetic energy output from the motion converter is greater than or equal to a predetermined threshold value, the motion converter may transfer the rotational kinetic energy to the power generation route so that the power generation may proceed. Meanwhile, when the magnitude of the rotational kinetic energy is less than the predetermined threshold value, the motion converter may exchange the rotational kinetic energy with the restoring force control route, so that a restoring force for preventing the performance degradation of the energy absorber or the motion converter may be controlled.

The rotational kinetic energy transfer between the motion converter and the restoring force control route may be performed. For example, when a tension of the connection member included in the energy absorber is less than or equal to a reference value and/or when a RPM of the rotating body included in the motion converter is less than or equal to the reference value, the rotational kinetic energy may be transferred from the restoring force control route to the motion converter. In other cases, the rotational kinetic energy may be transferred from the motion converter to the restoring force control route.

In operation 430, a power generation amount may be controlled based on a 3-phase current rectification scheme using the rotational kinetic energy transferred to the power generation route, and a restoring force of the motion converter may be controlled based on an inverter switching scheme using the rotational kinetic energy transferred to the restoring force control route.

As described above, advantages of the respective control schemes may be effectively employed by distributing the rotational kinetic energy to the power generation route and the restoring force control route based on a predetermined criterion, and by controlling the rotational kinetic energy distributed to the respective routes based on the 3-phase current rectification scheme and the inverter switching scheme.

Although the example embodiments are described above based on a system and method for controlling a wave power generation facility to generate power from wave energy and to supply the power to power systems, the example embodiments may be applicable to other power generation facilities using natural power to supply power variable by a variety of environmental factors.

The aforementioned example embodiments may be implemented using hardware components, software components, and/or combination of hardware components and software components. For example, the apparatuses, methods, and the components described herein may include a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include plurality of processing elements and plurality of types of processing elements. For example, a processing device may include plurality of processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations, other example embodiments, and the equivalents of the claims are within the scope of the following claims.

What is claimed is:

1. A system for controlling a power generation facility, the system comprising:
   a power transmitter comprising a connection member configured to transfer kinetic energy of a buoyant body that moves by wave energy, the connection member adapted to provide a tension between the power transmitter and a motion converter;
   the motion converter configured to convert the kinetic energy transferred from the power transmitter to rotational kinetic energy of a rotating body;
   a first route comprising a power generator and configured to receive the rotational kinetic energy from the motion converter, and to generate electric power; and
   a second route separate from the first route, comprising a motor, and configured to receive and store the rotational kinetic energy from the motion converter, and further to transfer, to the motion converter, rotational kinetic energy that is restored using stored energy.

2. The system of claim 1, wherein the first route comprises the power generator configured to generate alternating current (AC) power using the rotational kinetic energy.

3. The system of claim 2, further comprising:
   a power generation controller configured to control output AC power of the power generator using a 3-phase current rectification scheme.

4. The system of claim 1, wherein the second route is configured to transfer, to the motion converter, the rotational kinetic energy that is restored using the stored energy when the tension of the connection member is less than or equal to a reference value or when a revolution per minute (RPM) of the rotating body is less than or equal to the reference value.

5. The system of claim 1, wherein the second route comprises:
   a storage configured to store the rotational kinetic energy; and
   the motor configured to operate using the rotational kinetic energy or energy stored in the storage.

6. The system of claim 5, further comprising:
   a restoring force controller configured to control an energy transfer rate between the motor and the motion converter using an inverter switching scheme.

7. The system of claim 5, wherein the storage comprises a condenser in which the rotational kinetic energy is converted to electrical energy and thereby stored, and
   wherein the storage is configured to connect to an energy storage system configured to store the electric power generated through the first route, and to receive the energy stored through the first route from the energy storage system, or to transfer energy stored through the second route to the energy storage system.

8. The system of claim 5, wherein the second route further comprises a transmission configured to change a rotational speed and torque according to the rotational kinetic energy transferred between the motor and the motion converter.

9. A system for controlling a power generation facility, the system comprising:
   a power transmitter comprising a connection member configured to transfer kinetic energy generated from natural power, the connection member adapted to provide a tension between the power transmitter and a motion converter;
   the motion converter configured to convert the kinetic energy transferred from the power transmitter to rotational kinetic energy of a rotating body;
   a power generation route comprising a power generator and configured to receive the rotational kinetic energy from the motion converter, and to generate electric power; and
   a restoring force control route separate from the power generation route, comprising a motor and configured to receive and store the rotational kinetic energy from the motion converter, and further to transfer, to the motion converter, rotational kinetic energy that is restored using stored energy.

10. The system of claim 9, further comprising:
    a controller configured to control the motion converter to transfer the rotational kinetic energy to the power generation route when a magnitude of the rotational kinetic energy output from the motion converter is greater than or equal to a predetermined threshold value.

11. The system of claim 9, further comprising:
    a controller configured to control the motion converter to transfer the rotational kinetic energy to the restoring force control route or to receive the rotational kinetic energy from the restoring force control route when a magnitude of the rotational kinetic energy output from the motion converter is less than a predetermined threshold value.

12. The system of claim 11, wherein the controller is configured to control the motion converter to transfer the rotational kinetic energy that is restored using the stored energy from the restoring force control route when the tension of the connection member is less than or equal to a reference value or when a revolution per minute (RPM) of the rotating body is less than or equal to the reference value.

13. The system of claim 9, further comprising:
    a power generation controller configured to control output alternating current (AC) power of the power generation route using a 3-phase current rectification scheme.

14. The system of claim 9, further comprising:
    a restoring force controller configured to control an energy transfer rate between the restoring force control route and the motion converter using an inverter switching scheme.

15. The system of claim 9, wherein the restoring force control route comprises:
    a storage to store the converted rotational kinetic energy; and
    the motor configured to operate using the rotational kinetic energy or energy stored in the storage.

16. The system of claim 15, wherein the restoring force control route further comprises a transmission configured to change a rotational speed and torque according to the rotational kinetic energy transferred between the motor and the motion converter.

17. A method of controlling a power generation facility, the method comprising:
    transferring, by a connection member, kinetic energy that is generated from natural power to a motion converter, the connection member providing a tension between a power transmitter and the motion converter, and the power transmitter configured to transfer the kinetic energy generated from the natural power;
    converting, by the motion converter, the kinetic energy to rotational kinetic energy of a rotating body;
    measuring a magnitude of the rotational kinetic energy output from the motion converter, the motion converter providing both a power generation route comprising a power generator and configured to receive the rotational kinetic energy from the motion converter and to generate electric power and, separate from the power generation route, a restoring force control route comprising a motor and configured to receive and store the rotational kinetic energy from the motion converter and to transfer, to the motion converter, rotational kinetic energy that is restored using stored energy; and
    determining an energy transfer rate of the power generation route and an energy transfer direction and an energy transfer rate of the restoring force control route based on the measured magnitude of the rotational kinetic energy.

18. The method of claim 17, wherein the determining comprises:
    controlling the motion converter to transfer the rotational kinetic energy to the power generation route when the magnitude of the rotational kinetic energy output from the motion converter is greater than or equal to a predetermined threshold value.

19. The method of claim 17, wherein the determining comprises:
    controlling the motion converter to transfer the rotational kinetic energy to the restoring force control route or to receive the rotational kinetic energy from the restoring force control route when the magnitude of the rotational kinetic energy is less than or equal to a predetermined threshold value.

20. The method of claim 17, wherein the determining comprises:
    controlling the motion converter to receive the rotational kinetic energy from the restoring force control route when the tension of the connection member is less than or equal to a reference value or when a revolution per minute (RPM) of the rotating body is less than or equal to the reference value.

\* \* \* \* \*